D. HILL.
Fertilizer.
No. 100,762.
Patented March 15, 1870.
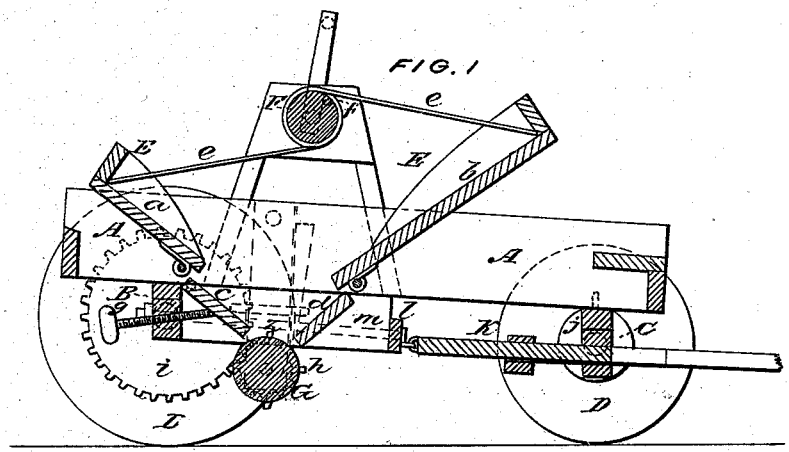
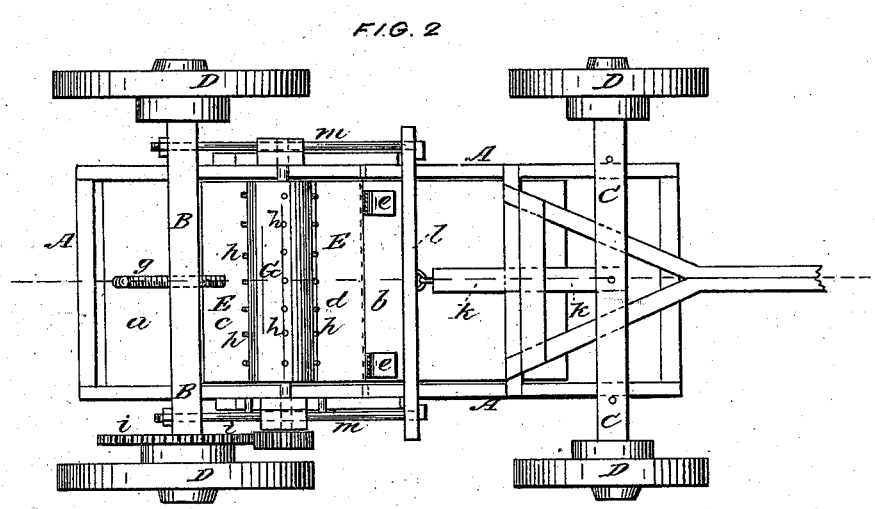
WITNESSES:
INVENTOR:

United States Patent Office.

DANIEL HILL, OF NEW VIENNA, OHIO, ASSIGNOR TO HIMSELF AND ISAAC I. EVANS, OF RICHMOND, INDIANA.

Letters Patent No. 100,762, dated March 15, 1870.

IMPROVEMENT IN MANURE-SPREADERS.

The Schedule referred to in these Letters Patent and making part of the same

*To all whom it may concern:*

Be it known that I, DANIEL HILL, of New Vienna, in the county of Clinton, and State of Ohio, have invented a new and improved Manure-Spreader; and I do hereby declare that the following is a full, clear, and exact description thereof, which will enable others skilled in the art to make and use the same, reference being had to the accompanying drawings forming part of this specification, in which—

Figure 1 represents a vertical longitudinal section of my improved manure-spreader.

Figure 2 is an inverted plan view of the same.

Similar letters of reference indicate corresponding parts.

This invention relates to a new machine for spreading manure and fertilizing material upon fields, in suitable desired quantities, but evenly, and without manual labor.

The invention consists in the construction of a wagon, which has an adjustable hopper and spreading apparatus, so that a suitable quantity of manure can be spread over a suitable extent of surface in the requisite thickness.

A in the drawing represents the wagon-box, supported on two axles, B C, which are hung in wheels D D', as shown, or on but one axle, if desired.

If the box A rests on four wheels, the rear axle B is rigidly attached to it, while the front axle is pivoted, as usually.

The box has an open bottom, but, continuous between the two axles, a hopper, E, which is to receive the fertilizer.

The hopper consists of four leaves or plates, two at each end, between the sides of the wagon-box. The two lower plates, *a b*, form the discharge end, while the upper plates *c d* receive the matter to be spread. The two upper outer plates are pivoted to the sides of the wagon-box, so that they can be swung into nearly horizontal or vertical positions.

Their upper ends are by straps *e e* connected with a windlass, F, by means of which their positions can be adjusted. They are pivoted near their lower ends, so that their weight tends to throw them outward. By means of the windlass they can therefore be drawn inward, *i. e.*, vertical, or released to drop outward, *i. e.*, horizontal.

By means of a pin, *f*, the windlass can be locked into any desired position.

One of the lower leaves, *a b*, is also pivoted and adjusted by a screw, *g*, lever, or other apparatus, to regulate the size of the lower discharge-opening.

A drum, G, is hung in the wagon-box, under the opening of the hopper, forming the bottom of the same.

The drum has projecting teeth or ribs *h h*.

The manure to be spread is thrown into the hopper when the upper leaves of the same are extended, and when then the drum is revolved, the contents of the hopper will be gradually and evenly discharged.

The drum is in gear with a toothed wheel, *i*, on one of the wheels, and can be readily thrown into or out of gear.

When the contents of the lower leaves are discharged, the upper leaves are swung up to gradually throw the entire contents of the hopper upon the drum. When the contents are not to be discharged, the drum is thrown out of gear.

By means of the screw *g*, or its equivalent, the thickness of the material spread is regulated.

When the apparatus is to be used on a two-wheeled vehicle, the hopper is to be set up in rear of the supporting-axle, while on a four-wheeled wagon it is between both axles.

The front axle may be pivoted to its bolster *j*, and by a suitable rod, *k*, or otherwise, be connected with a bar, *l*, that is, by braces *m*, connected with the rear axle.

Having thus described my invention,

I claim as new and desire to secure by Letters Patent—

1. The hopper E, consisting of four leaves, *a, b, c,* and *d*, of which three are pivoted and adjustable, as set forth.

2. The windlass F and the straps *e e*, arranged on the wagon with respect to the hopper, as and for the purpose specified.

DANIEL HILL.

Witnesses:
CHAS. C. BOWERS,
J. C. SAULEE.